United States Patent
Feng

(10) Patent No.: US 12,256,838 B2
(45) Date of Patent: Mar. 25, 2025

(54) BARBECUE COOKER SUPPORTING STRUCTURE WITH LIFTING BASE

(71) Applicant: Fu-Du Feng, Taipei (TW)

(72) Inventor: Fu-Du Feng, Taipei (TW)

( * ) Notice: Subject to any disclaimer, the term of this patent is extended or adjusted under 35 U.S.C. 154(b) by 151 days.

(21) Appl. No.: 18/222,016

(22) Filed: Jul. 14, 2023

(65) Prior Publication Data

US 2025/0017366 A1 Jan. 16, 2025

(51) Int. Cl.
*A47B 51/00* (2006.01)

(52) U.S. Cl.
CPC .................................. *A47B 51/00* (2013.01)

(58) Field of Classification Search
CPC ........................................................ A47B 51/00
See application file for complete search history.

(56) References Cited

U.S. PATENT DOCUMENTS

| | | | | |
|---|---|---|---|---|
| 2,575,725 A * | 11/1951 | Mckay | ................. | A47B 51/00 312/309 |
| 3,761,152 A * | 9/1973 | Cory | ..................... | A47B 51/00 312/7.2 |
| 5,273,352 A * | 12/1993 | Saper | .................... | A47B 81/00 312/7.2 |
| 6,733,094 B1 * | 5/2004 | Chang | ................ | A47B 21/0073 312/7.2 |
| 10,874,209 B1 * | 12/2020 | Dunseath | ............... | A47B 57/06 |
| 2006/0076860 A1 * | 4/2006 | Hoss | ..................... | A47B 81/064 312/312 |
| 2019/0195551 A1 * | 6/2019 | Grant | .................... | A47B 51/00 |
| 2020/0277770 A1 * | 9/2020 | Hong | ................... | A47B 77/022 |
| 2021/0262146 A1 * | 8/2021 | Burgess | ................ | D06F 39/125 |
| 2023/0148749 A1 * | 5/2023 | Sevadjian | ................ | B25H 1/20 312/107 |
| 2023/0249908 A1 * | 8/2023 | Steinberg | ............... | B65G 1/026 211/209 |
| 2024/0415364 A1 * | 12/2024 | Moreau | ................. | A47B 51/00 |

* cited by examiner

*Primary Examiner* — Daniel J Rohrhoff
(74) *Attorney, Agent, or Firm* — Juan Carlos A. Marquez; Marquez IP Law Office, PLLC

(57) ABSTRACT

A barbecue cooker supporting structure with a lifting base includes a frame, a lifting mechanism, and a barbecue cooker support. The lifting mechanism has a spiral guide rod with a first toothed disc, a rotating shaft configured to rotate the first toothed disc via a second toothed disc, and a sliding member configured to slide upward or downward when the spiral guide rod is rotated. The barbecue cooker support is configured to move along with the sliding member and has supporting guide plates each slidably received in a lifting guide rail. The barbecue cooker supporting structure helps reduce packaging materials and waste resulting therefrom and allows a barbecue cooker to be easily packaged, stored, and moved (e.g., lifted and lowered).

11 Claims, 9 Drawing Sheets

BARBECUE COOKER SUPPORTING STRUCTURE WITH LIFTING BASE

BACKGROUND OF THE INVENTION

1. Technical Field

The present invention relates to a barbecue cooker supporting structure with a lifting base. More particularly, the invention relates to a barbecue cooker supporting structure that has a lifting base and can be used to support and package a ceramic barbecue cooker.

2. Description of Related Art

Referring to FIG. 1A to FIG. 1C, a conventional method for packaging a barbecue cooker to be transported over a long distance is to package the barbecue cooker with a paper pallet P110, vertical paper columns P120, and a paper box P130. When the barbecue cooker arrives at the user end and is unboxed for use, all the packaging materials, including the paper pallet P110, the vertical paper columns P120, and the paper box P130, will be removed and discarded as waste. Moreover, the production of the aforesaid packaging materials requires a lot of trees to be felled, which causes damage to the environment.

SUMMARY OF THE INVENTION

The present invention provides a barbecue cooker supporting structure that has a lifting base. The invention is intended mainly to solve problems associated with the packaging of a ceramic barbecue cooker, such as how to reduce the packaging materials required for transporting the barbecue cooker, how to reduce the waste resulting from the packaging materials after the barbecue cooker is put to use, how to package the barbecue cooker with greater ease, how to move (e.g., lift and lower) the barbecue cooker more easily to facilitate use, and how to store the barbecue cooker more conveniently after use.

The present invention provides a barbecue cooker supporting structure that has a lifting base. The barbecue cooker supporting structure includes a frame, a lifting mechanism, a barbecue cooker support, and a set of lifting guide rails. The lifting mechanism has: a spiral guide rod fixedly provided on one side of the frame, wherein the spiral guide rod has an end portion provided with a first toothed disc; a rotating shaft fixedly provided on the frame and configured to drive the first toothed disc through a second toothed disc such that the first toothed disc is rotated; and a sliding member provided on the spiral guide rod and configured to slide upward or downward in response to rotation of the spiral guide rod. The barbecue cooker support is coupled to the sliding member in such a way that the barbecue cooker support can be moved along with the sliding member, and the barbecue cooker support has a set of supporting guide plates. The set of lifting guide rails are fixedly provided on the frame, and each of the supporting guide plates is received in the corresponding one of the lifting guide rails.

Implementation of the present invention can produce at least the following advantageous effects:
1. The expenses of the packaging materials required for long-distance transportation of a barbecue cooker can be greatly reduced, and so can the waste resulting from such packaging materials.
2. A barbecue cooker can be packaged more conveniently, and stored more easily after use, than achievable with the prior art.
3. A user of a barbecue cooker can move (e.g., lift and lower) the barbecue cooker more conveniently than the prior art allows.

BRIEF DESCRIPTION OF THE DRAWINGS

The structure and technical means adopted by the present invention to achieve the above and other objectives can be best understood by referring to the following detailed description of a preferred embodiment and the accompanying drawings, wherein.

DETAILED DESCRIPTION OF THE INVENTION

Figure 1A:
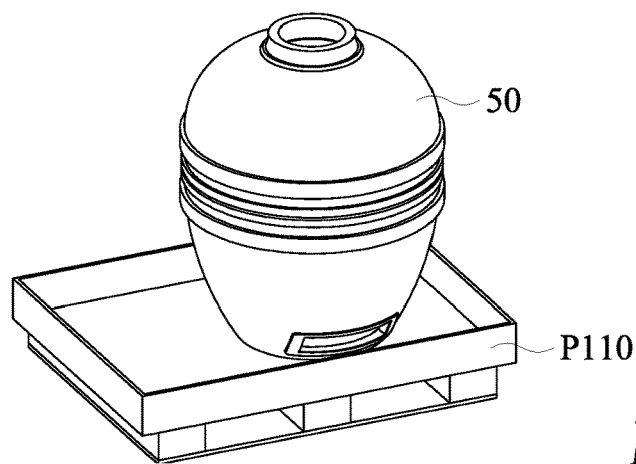
FIG. 1A is a perspective view showing a conventional barbecue cooker disposed on a paper pallet.
Figure 1B:
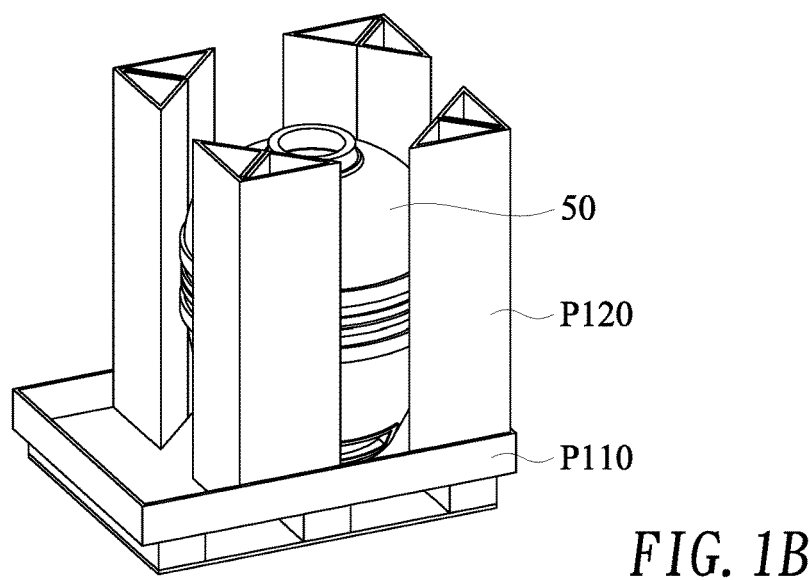
FIG. 1B is a perspective view showing the conventional barbecue cooker in FIG. 1A surrounded by vertical paper columns.
Figure 1C:
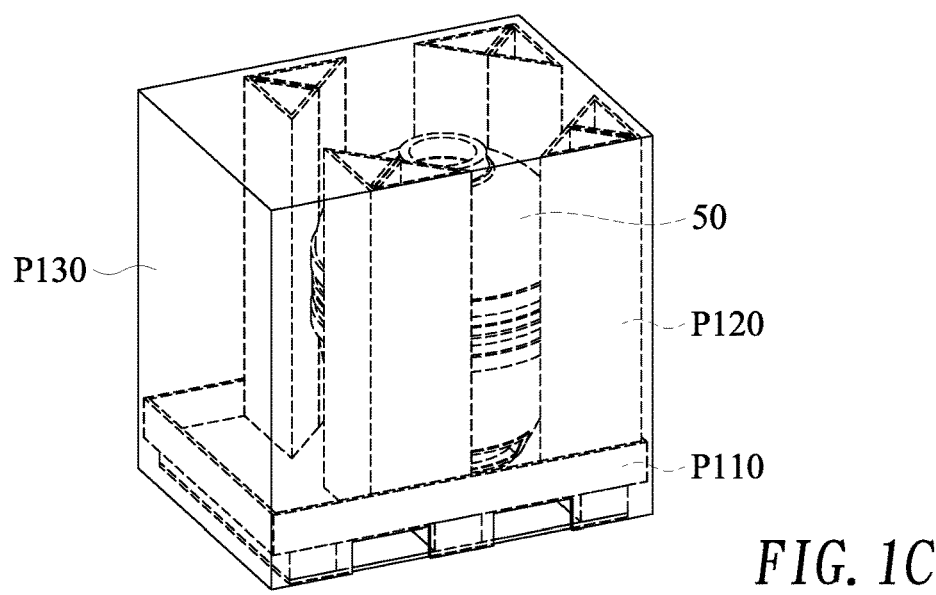
FIG. 1C is a see-through view showing the conventional barbecue cooker in FIG. 1B housed in a paper box to complete its packaging process.
Figure 2A:
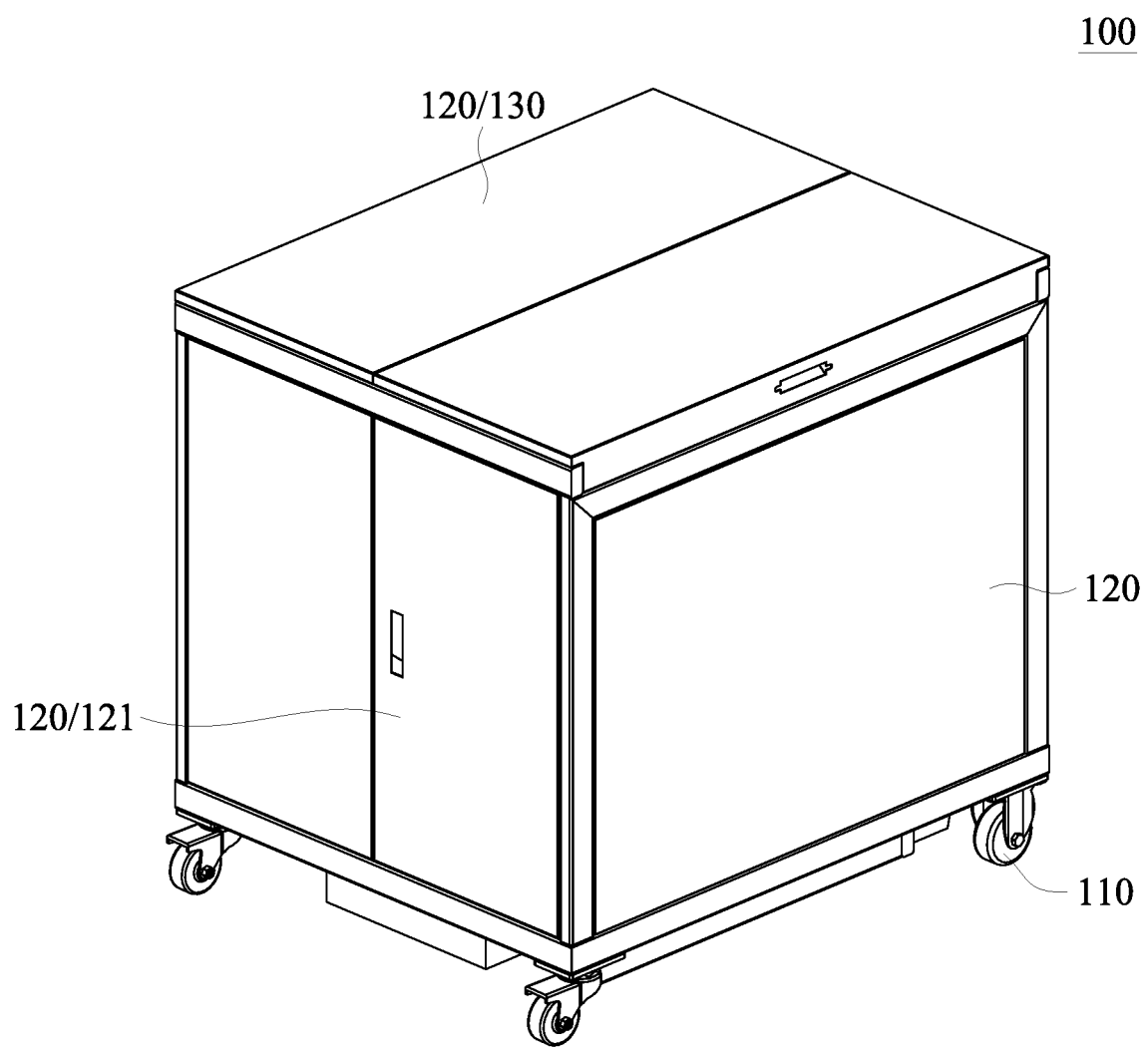
FIG. 2A is a perspective view of a barbecue cooker supporting structure with a lifting base as disclosed by the invention.
Figure 2B:
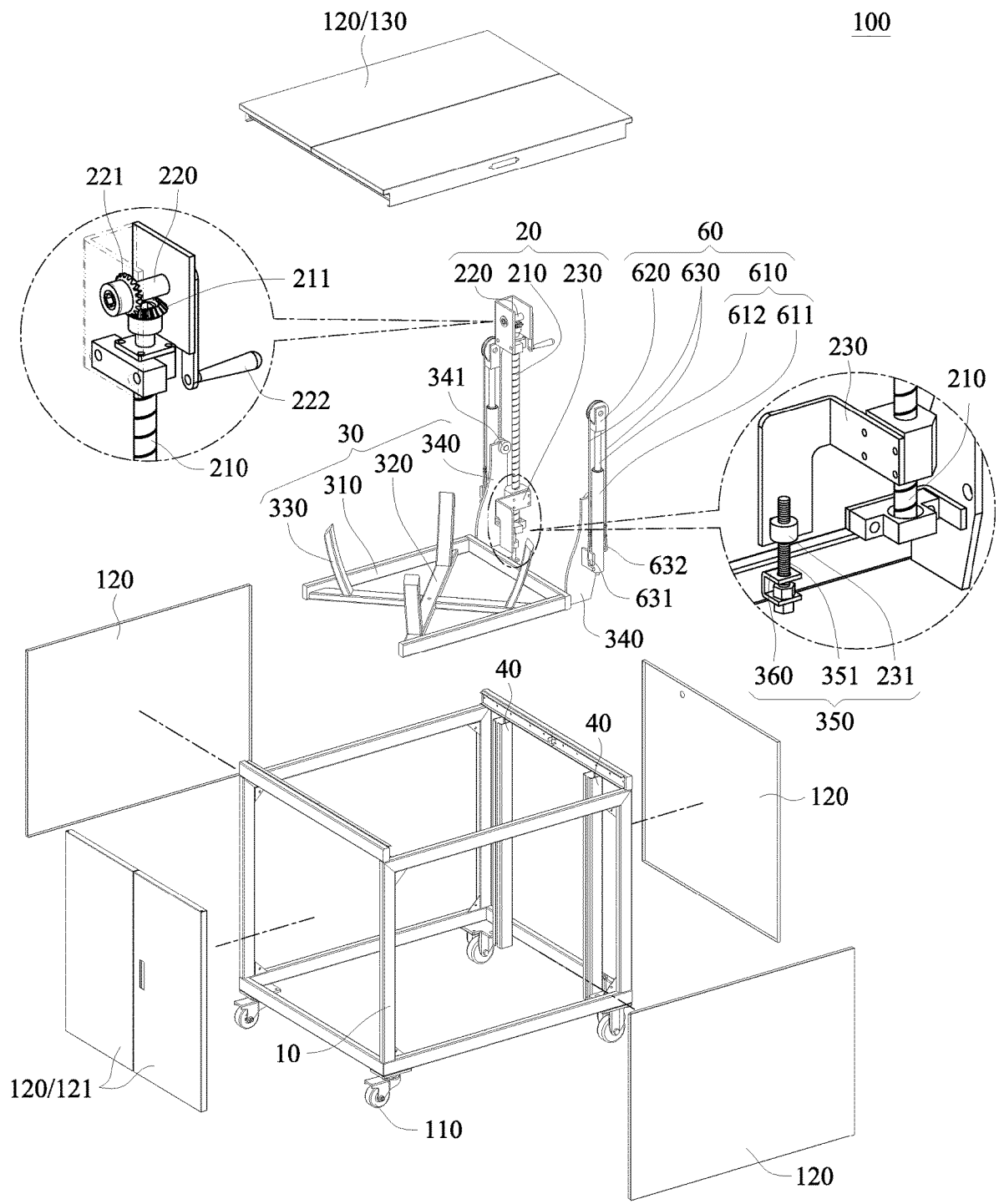
FIG. 2B is an exploded perspective view of the barbecue cooker supporting structure with a lifting base as shown in FIG. 2A.

Referring to the embodiment shown in FIG. 2A and FIG. 2B, the barbecue cooker supporting structure 100 with a lifting base includes a frame 10, a lifting mechanism 20, a barbecue cooker support 30, and a set of lifting guide rails 40.

The frame 10 may be a metal frame 10 in the shape of a rectangular cuboid so as to provide the optimal support. The frame 10 serves not only to support, and make it easier to use, a barbecue cooker 50 during a barbecue, but also to replace the packaging materials that are conventionally required for packaging the barbecue cooker 50 and that will be discarded after unboxing. The frame 10, therefore, helps reduce cost significantly and contributes to environmental protection. The bottom side of the frame 10 may be coupled with a plurality of casters 110 to facilitate movement.

The lifting mechanism 20 is configured to lift and lower the barbecue cooker 50. The lifting mechanism 20 has a spiral guide rod 210, a rotating shaft 220, and a sliding member 230. When it is desired to use the barbecue cooker 50 for barbecuing, the lifting mechanism 20 can be operated by the user in order to lift the barbecue cooker 50 to a height at which the cooker lid 510 can be easily opened.

The spiral guide rod 210 may be a ball screw. The spiral guide rod 210 is fixedly provided on one side of the frame 10 in a vertical standing position. An end portion of the spiral guide rod 210 is provided with a first toothed disc 211. When the first toothed disc 211 is rotated, the spiral guide rod 210 is rotated together with, and simultaneously with, the first toothed disc 211.

The rotating shaft 220 is fixedly provided on the frame 10. When rotated by the user, the rotating shaft 220 drives the first toothed disc 211 through a second toothed disc 221 such that the first toothed disc 211 is rotated, and the spiral guide rod 210 is rotated along with the first toothed disc 211 as a result. To make it easier for the user to operate the rotating shaft 220, the rotating shaft 220 may be coupled with a crank 222 by an assembly method in order for the crank 222 to facilitate operation of the rotating shaft 220.

The sliding member 230 is provided on the spiral guide rod 210. The sliding member 230 is configured to slide upward or downward when the spiral guide rod 210 is rotated. When sliding upward or downward, the sliding member 230 provides kinetic energy for lifting or lowering the barbecue cooker 50.

The barbecue cooker support 30 serves mainly to carry the barbecue cooker 50. The barbecue cooker support 30 is coupled to the sliding member 230 in such a way that when the sliding member 230 is moved upward, the barbecue cooker support 30 is moved upward along with the sliding member 230, and that when the sliding member 230 is moved downward, the barbecue cooker support 30 is moved downward along with the sliding member 230.

The barbecue cooker support 30 is an inverted square U-shaped structure 310 surrounding a rectangular area, and the inverted square U-shaped structure 310 has X-shaped braces 320 in the rectangular area in order for the barbecue cooker support 30 to provide absolutely sufficient support for the barbecue cooker 50 and hence be able to support the barbecue cooker 50 securely. To prevent the barbecue cooker 50 from wobbling, the inverted square U-shaped structure 310 may further have a set of upstanding support members 330. The upstanding support members 330 are configured to support, and form close contact with the periphery of, the barbecue cooker 50 so that the barbecue cooker 50 is firmly held in place.

The barbecue cooker support 30 further has a set of supporting guide plates 340. The supporting guide plates 340 may be coupled to two lateral sides of the barbecue cooker support 30 in a standing manner and configured to move along with the barbecue cooker support 30. Therefore, the supporting guide plates 340 not only can help the barbecue cooker support 30 provide greater support for the barbecue cooker 50, but also can join forces with the sliding member 230 to support the barbecue cooker support 30.

The barbecue cooker support 30 and the sliding member 230 may be coupled to each other by a height adjusting member 350 so that the distance between the barbecue cooker support 30 and the sliding member 230 can be easily fine-tuned. The height adjusting member 350 includes a threaded rod 351. One end of the threaded rod 351 is threadedly and rotatably coupled to a nut unit 231 of the sliding member 230 to enable adjustment in height. The other end of the threaded rod 351 may be fixed to a locking unit 360 of the barbecue cooker support 30 by a nut.

The lifting guide rails 40 are fixedly provided on the frame 10 in a standing manner, with each supporting guide plate 340 received in the corresponding lifting guide rail 40.

More specifically, each supporting guide plate 340 is received in the corresponding lifting guide rail 40 and is configured to slide in the corresponding lifting guide rail 40 via a corresponding guide wheel 341 in order to be lifted or lowered. The supporting guide plates 340, therefore, can provide even support for the barbecue cooker support 30 and allow the barbecue cooker 50 to be lifted and lowered stably.

Figure 3A:
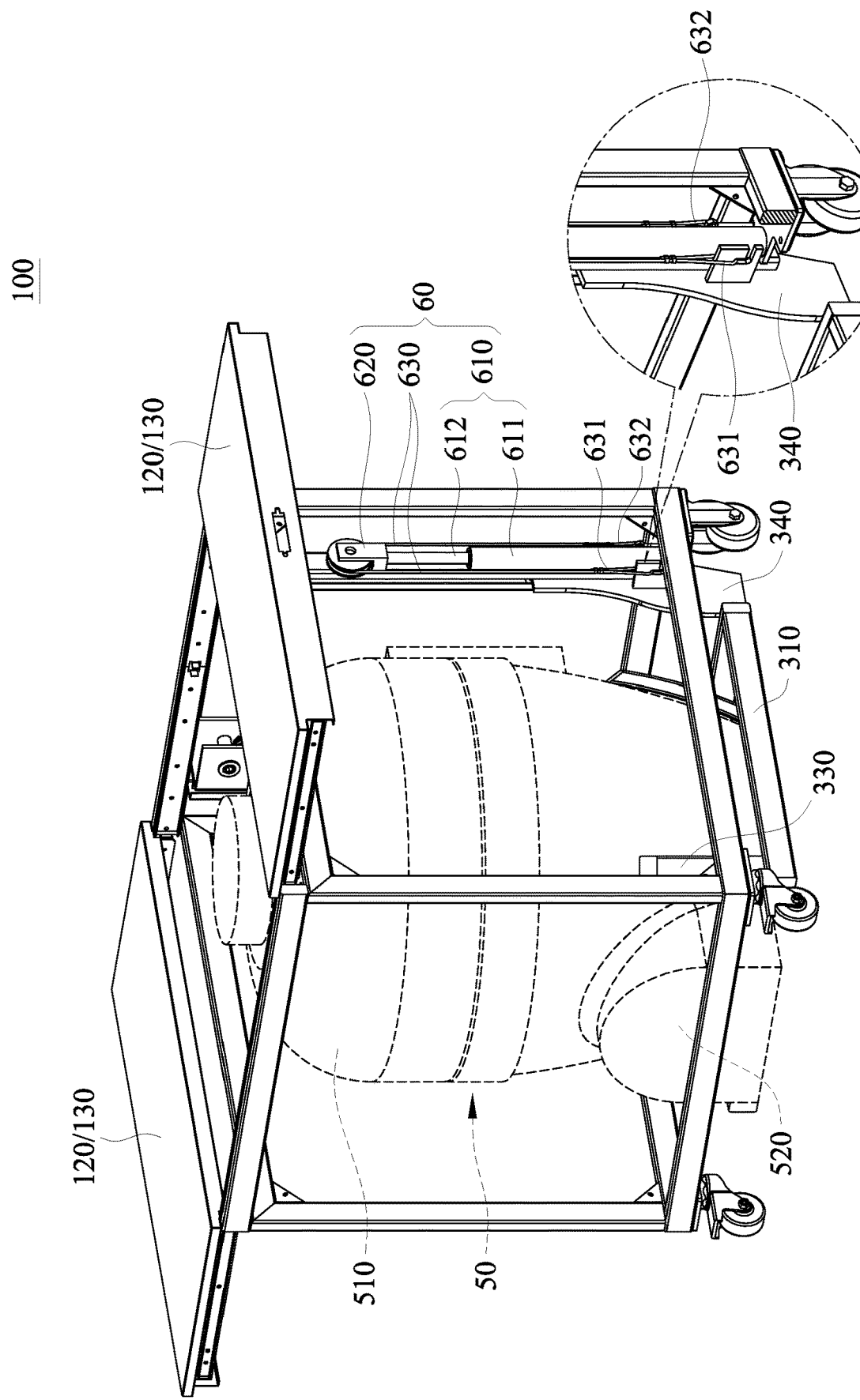
FIG. 3A is a perspective view showing the barbecue cooker support held in a lowered state by the positioning modules.
Figure 3B:
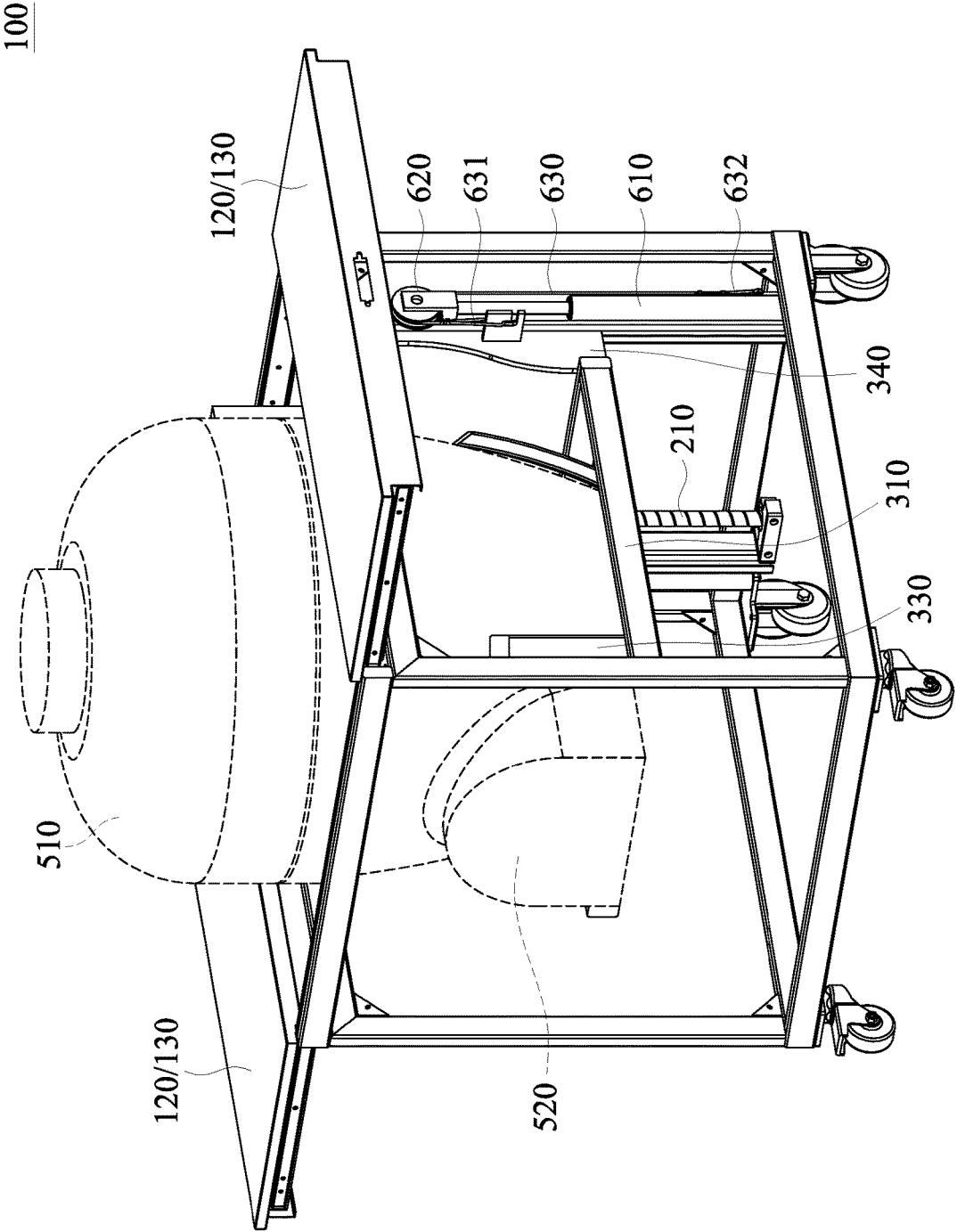
FIG. 3B is a perspective view showing the barbecue cooker support positioned in mid-air by the positioning modules.

Referring to FIG. 3A and FIG. 3B, the barbecue cooker supporting structure 100 with a lifting base may further have a set of positioning modules 60, wherein each positioning module 60 has a damper 610, a fixed pulley 620, and a steel cable 630.

When the barbecue cooker support 30 is used to carry a ceramic barbecue cooker 50, which may weigh more than 100 kg, the positioning modules 60 can prevent the barbecue cooker support 30 from falling due to the heavy weight of the ceramic barbecue cooker 50 and allow the ceramic barbecue cooker 50 to be stopped and supported in mid-air, or more particularly at a height at which the ceramic barbecue cooker 50 can be easily operated for barbecuing.

Each damper 610 has a damper base 611 fixedly provided on the frame 10, or more particularly at a lower portion of the frame 10. Each damper 610 has a telescopic rod 612 for bearing the force to be dampened.

The damping force of the dampers 610 is generally equal to the weight of the ceramic barbecue cooker 50, and the difference between the damping force and the weight of the ceramic barbecue cooker 50 is such that when it is desired to lift or lower the barbecue cooker 50, the barbecue cooker support 30 can be easily moved upward or downward and positioned at any height by the user applying a small amount of force to the crank 222 to guide the sliding member 230 upward or downward along the spiral guide rod 210.

The fixed pulleys 620 can change the direction of force to facilitate force application. Each fixed pulley 620 is fixedly provided at, and can therefore move along with, an end portion of the telescopic rod 612 of the corresponding damper 610.

Each steel cable 630 has a first end portion 631 fixedly provided on one of the supporting guide plates 340. Each steel cable 630 further has a second end portion 632 that is wound around the corresponding fixed pulley 620 and then coupled to the frame 10.

When the barbecue cooker support 30 is moved upward or downward, the supporting guide plates 340 are moved upward or downward by the barbecue cooker support 30. As the first end portions 631 of the steel cables 630 are coupled to the supporting guide plates 340, the supporting guide plates 340 also apply a force to the first end portions 631 of the steel cables 630. The force applied to the first end portions 631 is in turn transmitted to the fixed pulleys 620 given that the second end portions 632 of the steel cables 630 are fixed on the frame 10. Since the fixed pulleys 620 are fixedly provided at the end portions of the telescopic rods 612, the dampers 610 are driven to work.

Figure 4A:
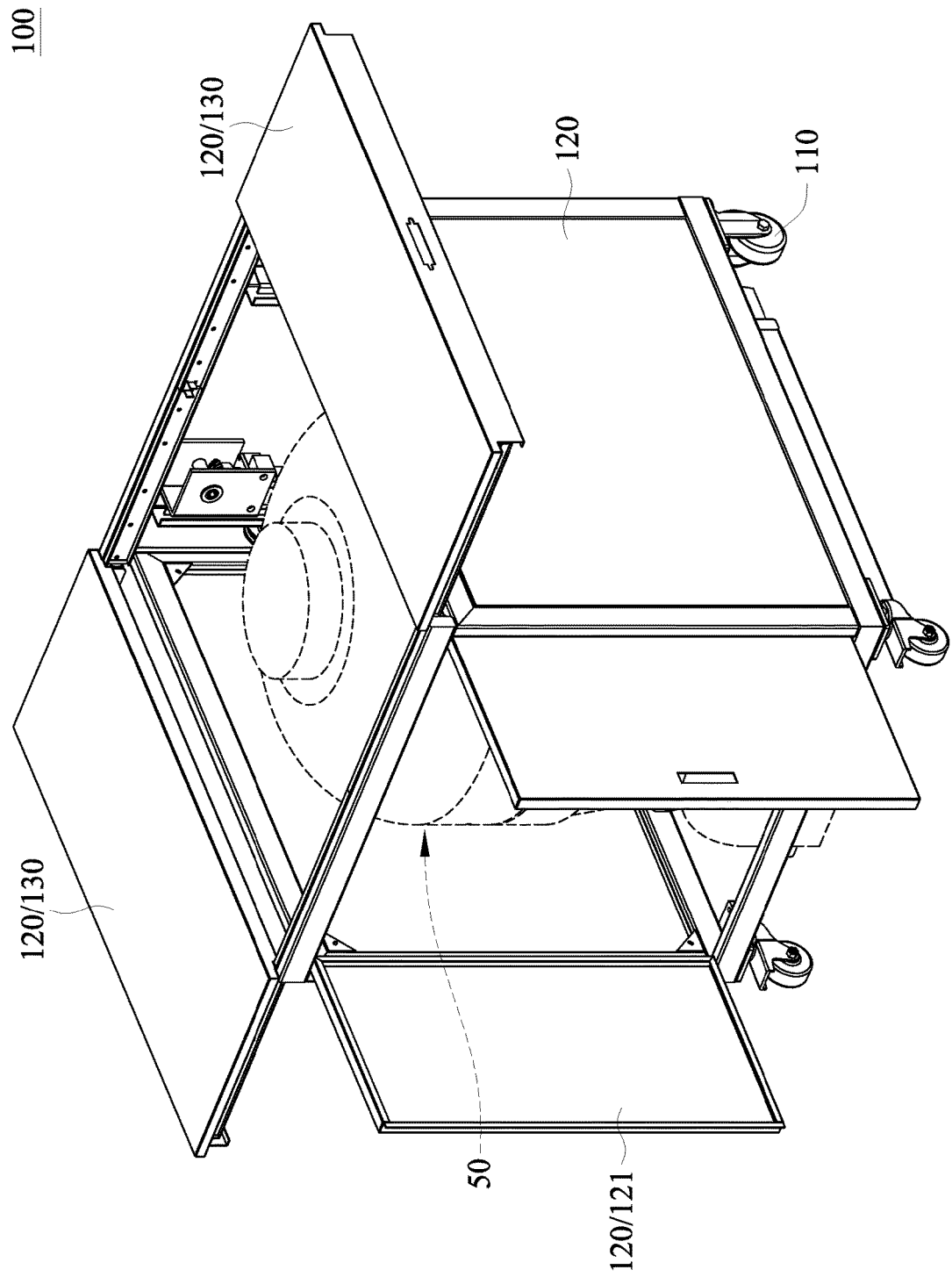
FIG. 4A is a perspective view showing a state of use of the door panels and the sliding top panels.

To form a complete package structure, referring to FIG. 4A, the four vertical sides of the frame 10 are further coupled with a set of sealing panels 120. The sealing panels 120 corresponding to one of the four vertical sides are configured as a set of door panels 121. Once the door panels 121 are opened, the draft door 520 of the ceramic barbecue cooker 50 can be operated.

Figure 4B:
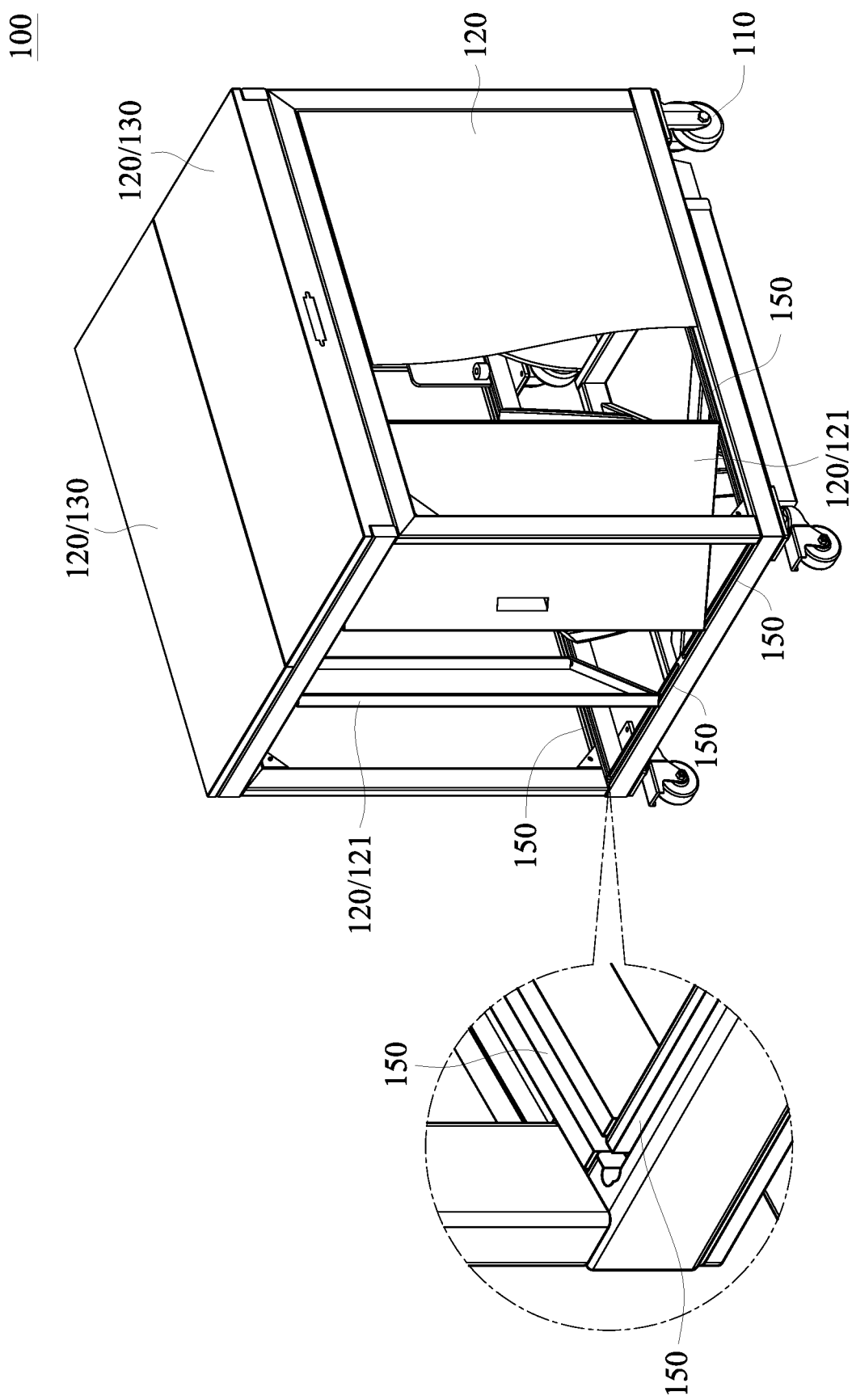
FIG. 4B is a perspective view showing the door panels retracted via the door panel slide rails.
Figure 4C:
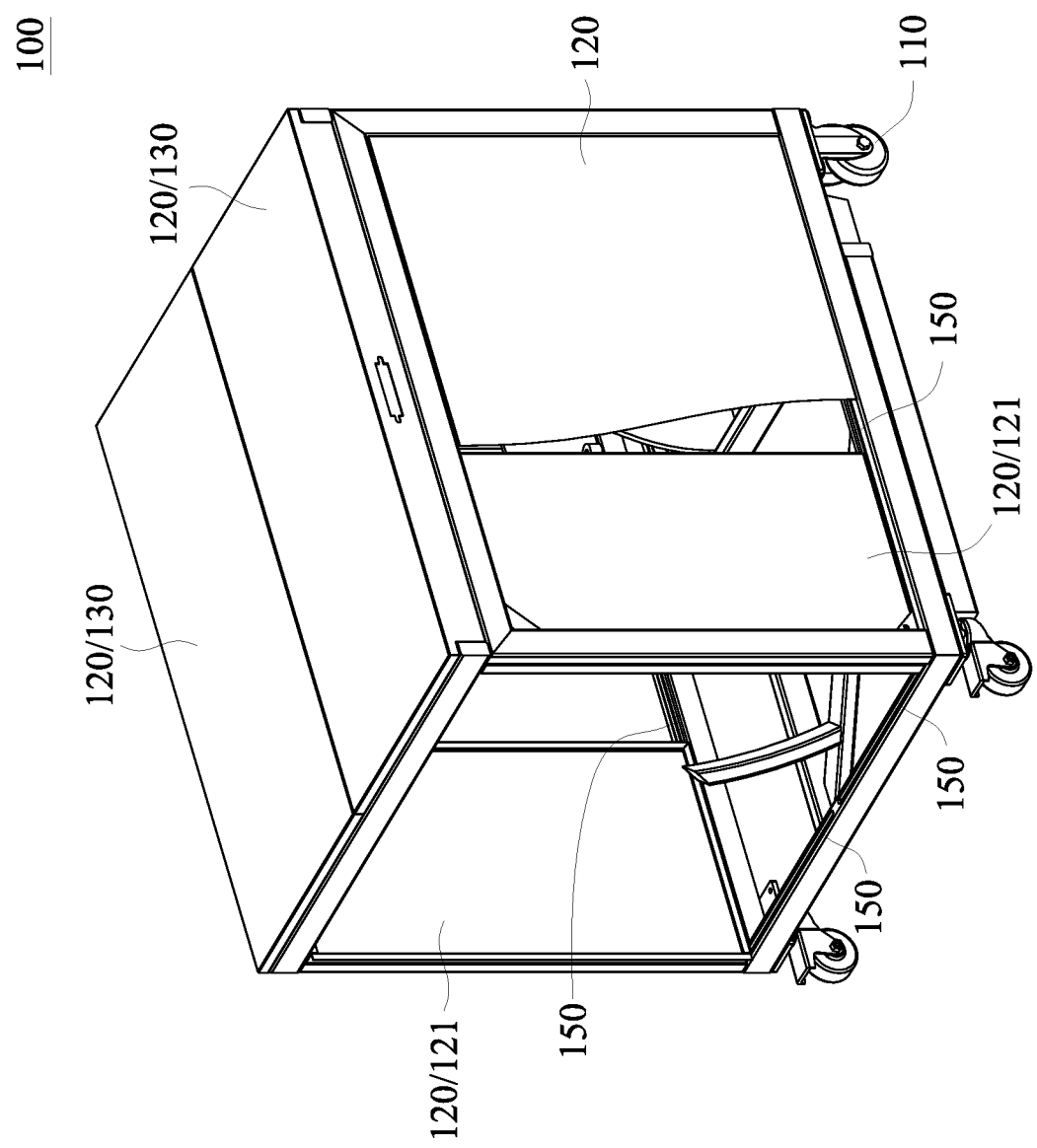
FIG. 4C is another perspective view showing the door panels retracted via the door panel slide rails.

While the door panels 121 in FIG. 4A are designed to be opened by pulling them outward, or more specifically by pivoting them outward, each of the door panels 121 may alternatively be coupled to a set of L-shaped door panel slide rails 150 that are provided on an upper member and a lower member of the frame 10, so that the door panels 121 can be slid, and completely retracted, to the inner sides of the adjacent sealing panels 120, as shown in FIG. 4B and FIG. 4C.

The top side of the frame 10 may be further coupled with sliding top panels 130, which can be viewed as sealing panels 120 corresponding to the top side of the frame 10. When it is desired to use the barbecue cooker 50, the sliding top panels 130 can be pulled open in opposite lateral directions to form a top opening in the top side of the frame 10, allowing the barbecue cooker 50 to be lifted. The sliding top panels 130 can also function as a tabletop where objects can be placed.

In the stage in which the barbecue cooker 50 is being transported, the frame 10, the sealing panels 120, and the sliding top panels 130 work in place of the packaging materials conventionally used for long-distance transportation. In the stage of normal use of the barbecue cooker 50, the frame 10, the sealing panels 120, and the sliding top panels 130 provide protection for the barbecue cooker 50 and allow the barbecue cooker 50 to be stored with ease.

Figure 5:
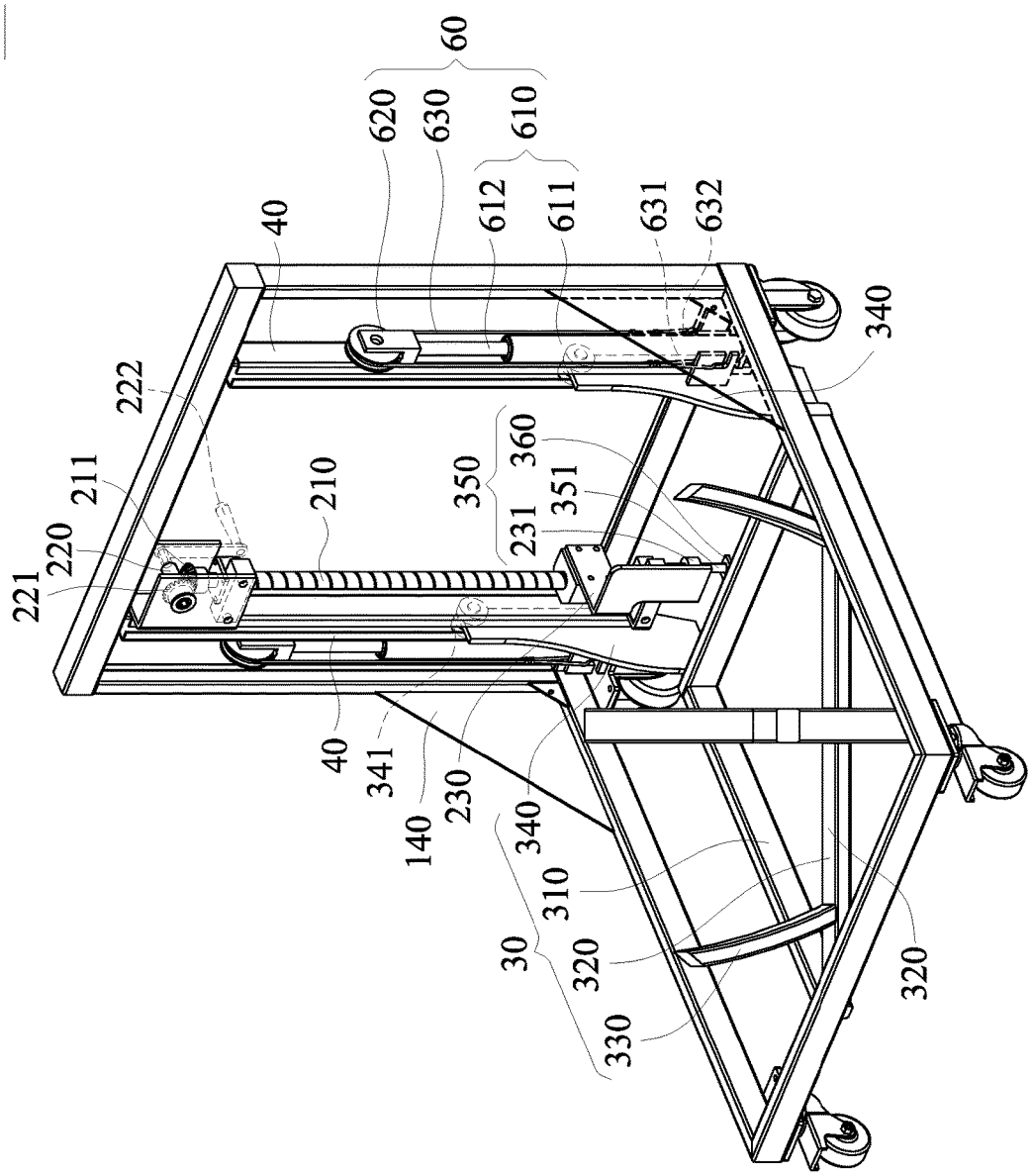
FIG. 5 is a perspective view in which the frame, the sealing panels, and/or the sliding top panels have been partially removed.

Furthermore, in the stage of normal use, referring to FIG. 5, the user may choose to remove the frame 10, the sealing panels 120, and/or the sliding top panels 130 partially so that the barbecue cooker 50 can be operated more conveniently. In that case, the frame 10 may be added with a panel-like or strip-like reinforcing member 140 to increase the structural strength of the frame 10.

The above description is based on only a preferred embodiment of the present invention and is not intended to limit the invention in any way. Although the invention has been disclosed above by way of the preferred embodiment, the embodiment is not intended to limit the invention. A person skilled in the relevant art will recognize that equivalent embodiments can be achieved by modifying, varying, or making equivalent changes to the disclosed embodiment without departing from the scope of the technical solution of the invention. Any simple modification or equivalent change that is made to the above embodiment according to the material contents of the invention shall be regarded as falling within the scope of the technical solution of the invention.

What is claimed is:

1. A barbecue cooker supporting structure with a lifting base, comprising:
    a frame;
    a lifting mechanism having:
        a spiral guide rod fixedly provided on one side of the frame, wherein the spiral guide rod has an end portion provided with a first toothed disc;
        a rotating shaft fixedly provided on the frame and configured to drive the first toothed disc via a second toothed disc such that the first toothed disc is rotated; and
        a sliding member provided on the spiral guide rod and configured to slide upward or downward in response to rotation of the spiral guide rod;
    a barbecue cooker support coupled to the sliding member in such a way that the barbecue cooker support is movable along with the sliding member, wherein the barbecue cooker support has a set of supporting guide plates; and
    a set of lifting guide rails fixedly provided on the frame, wherein each of the supporting guide plates is received in a corresponding one of the lifting guide rails.

2. The barbecue cooker supporting structure with a lifting base as claimed in claim 1, further comprising a set of positioning modules, wherein each of the positioning modules has:
    a damper having a damper base fixedly provided on the frame;
    a fixed pulley fixedly provided at an end portion of a telescopic rod of the damper; and
    a steel cable having a first end portion fixedly provided on a corresponding one of the supporting guide plates and a second end portion wound around the fixed pulley and then coupled to the frame.

3. The barbecue cooker supporting structure with a lifting base as claimed in claim 1, wherein the frame is a metal frame.

4. The barbecue cooker supporting structure with a lifting base as claimed in claim 1, wherein the frame has four vertical sides coupled with a set of sealing panels, and said sealing panels corresponding to one of the four vertical sides of the frame are a set of door panels.

5. The barbecue cooker supporting structure with a lifting base as claimed in claim 4, wherein the rotating shaft is coupled with a crank.

6. The barbecue cooker supporting structure with a lifting base as claimed in claim 1, wherein the frame has a top side coupled with a sliding top panel.

7. The barbecue cooker supporting structure with a lifting base as claimed in claim 1, wherein the frame has a bottom side coupled with a plurality of casters.

8. The barbecue cooker supporting structure with a lifting base as claimed in claim 1, wherein the barbecue cooker support is an inverted square U-shaped structure surrounding a rectangular area, and the inverted square U-shaped structure has X-shaped braces in the rectangular area.

9. The barbecue cooker supporting structure with a lifting base as claimed in claim 8, wherein the inverted square U-shaped structure further has a set of upstanding support members.

10. The barbecue cooker supporting structure with a lifting base as claimed in claim 1, wherein the barbecue cooker support and the sliding member are coupled to each other by a height adjusting member.

11. The barbecue cooker supporting structure with a lifting base as claimed in claim 4, wherein each of the door panels is coupled to a set of L-shaped door panel slide rails provided on an upper member and a lower member of the frame, such that each of the door panels is able to be retracted completely to an inner side of one of the other sealing panels.

* * * * *